March 9, 1954 W. F. McILHENNY ET AL 2,671,714
CONTINUOUS METHOD FOR CONCENTRATING IONS IN SOLUTIONS
Filed April 10, 1952
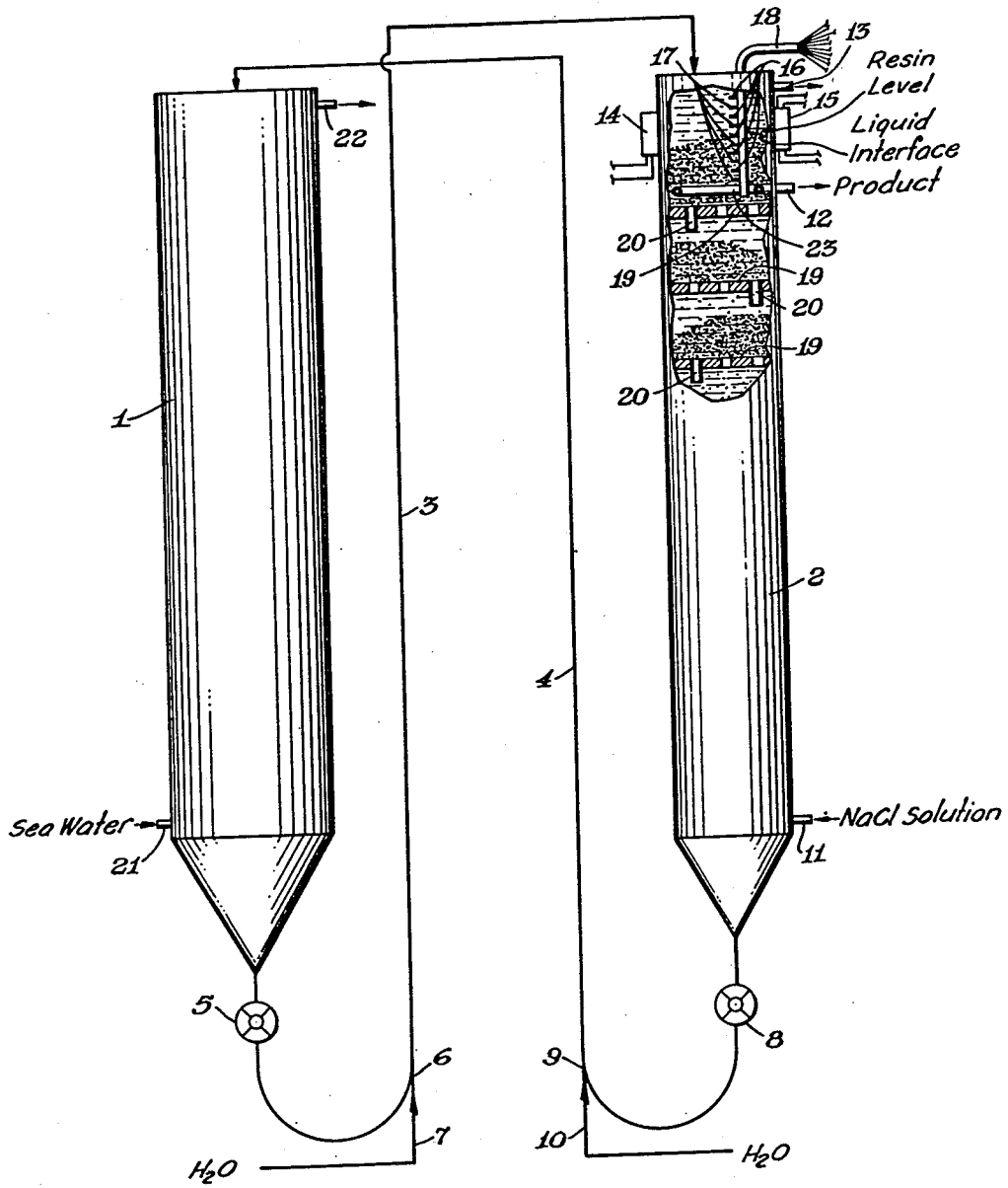
INVENTORS
William F. McIlhenny
Vernon O. McConnell
BY Griswold & Burdick
ATTORNEYS Patented Mar. 9, 1954

2,671,714

UNITED STATES PATENT OFFICE 2,671,714

CONTINUOUS METHOD FOR CONCENTRATING IONS IN SOLUTIONS

William F. McIlhenny and Vernon O. McConnell, Freeport, Tex., assignors to The Dow Chemical Company, Midland, Mich., a corporation of Delaware Application April 10, 1952, Serial No. 281,551

8 Claims. (Cl. 23—91)

This invention concerns an improved method for carrying out ion exchange reactions to effect a concentration of desired ions, either in solutions containing such ions, or with respect to all ions having the same kind of electrical charge, i. e. positive or negative, in solutions containing mixtures of such ions, or both. It pertains especially to the treatment of dilute solutions of magnesium salts, e. g. sea water or other magnesium-containing natural brines, for purpose of producing solutions containing magnesium salts in higher molal concentrations.

Several ion exchange methods have heretofore been proposed, e. g. in U. S. Patents 1,671,864, 1,707,302, 1,740,199, and 1,770,580, for softening water in a continuous manner. In such processes, a cation exchange agent, after becoming exhausted through use in removing calcium and magnesium ions from water, is regenerated by treatment with an aqueous sodium chloride solution, then washed with water, and the used regenerant liquor and washings are discarded. Such water-softening processes are neither intended for, nor well-adapted to, the purpose of concentrating ions present in a starting liquid.

Grebe and Bauman, in U. S. Patent 2,387,898, disclose an ion exchange method for concentrating the magnesium salts of sea water and teach a way in which said method can be practiced in a continuous manner. Their method involves passing sea water through a bed of a cation exchange agent, whereby magnesium ions are chemically absorbed by the agent. A fairly concentrated sodium chloride solution is then passed through the bed to displace the absorbed magnesium ions with sodium ions, thus regenerating the cation exchange agent and producing a magnesium chloride solution. The effluent magnesium chloride solution is collected as a series of fractions of varying concentrations. The mid-fractions are far more concentrated than sea water with respect to magnesium ions and are of sufficient concentration to warrant other steps, e. g. evaporation and crystallization, for recovery of solid magnesium chloride therefrom. A number of the other, and less concentrated, fractions are treated with sodium chloride and recycled in the process to recover a further amount of magnesium chloride therefrom. The initial and final fractions of the effluent liquor are very dilute with respect to magnesium ions and are discarded. This series of operations may be repeated to concentrate further amounts of magnesium chloride. The patent teaches that by simultaneously employing two or more beds of the cation exchange agent, and alternating the flow of sea water from one bed to another while passing a concentrated sodium chloride solution through the beds that have been treated with sea water, its process can be practiced in a continuous manner. However, such continuous process requires employment of a large amount of equipment and involves a considerable number of steps which must be carefully controlled and maintained in balance with one another. Because of its complexity, this known continuous procedure for concentrating magnesium salt solutions is not well adapted to commercial practice.

It is an object of this invention to provide a relatively simple and practical ion exchange method for concentrating, in a continuous manner, ions occuring in liquid solutions, especially in dilute aqueous solutions, of ionizable compounds. A particular object is to provide such continuous process for concentrating the magnesium ions occuring in sea water and in other natural brines. Other objects will be evident from the following description of the invention.

The accompanying drawing is a diagrammatic sketch of one of various arrangements of apparatus which may be employed in practice of the invention. The drawing indicates the flow of materials through the apparatus and the approximate location of adjacent liquid layers in a zone within which they are maintained in contact with one another.

In the drawing, the numerals 1 and 2 designate a pair of ion exchange columns which are connected with one another by a line 3 leading from the bottom of column 1 to an upper section of column 2 and by a line 4 leading from the bottom of column 2 to an upper section of column 1. Interposed in line 3 are a star valve, or similar device functioning as a lock discharge valve, 5, and a water jet 6 which is provided with a feed line 7. Similarly, in line 4 there are interposed a star valve 8 and a jet 9 having a feed line 10. Column 1 is provided with an inlet 21 for feeding a solution of an ionizable material, e. g. sea water, to a lower section thereof and an outlet 22 from an upper section of the column. The inlet 21 and outlet 22 are preferably connected with perforated headers, i. e. spargers, not shown, for feeding and collecting liquid at a number of points throughout the cross sectional area of the column.

Column 2, which is used for regenerating an ion exchange material to produce the solution of an ionizable compound that is desired as the product, comprises, in a lower section thereof, an inlet 11 for a regenerating liquid, e. g. a sodium chloride solution. The inlet 11 is preferably connected with a sparger, not shown, inside the column. An upper section of column 2 is provided with a ring-shaped perforated header, 23 which connects with an outlet 12 for the solution of an ionizable compound that is obtained as the product. Above the outlet 12 is another outlet 13 for a carrying liquid, e. g. water, that is used in transporting ion exchange material to the column. The upper section of column 2 is also provided with a lamp 14, which is positioned so as to direct light through a fluid inside the column and with a photoelectric cell, or other light-responsive member 15, positioned to receive the light and to be actuated thereby. The electric current from cell 15 varies with changes in the intensity of the light received by the cell. This electric current may be employed in usual ways, not indicated in the drawing, to control the rate of movement of one or more materials through the system. In practice, it is amplified and used to control a valve, not shown, which regulates the rate of feed of water through line 7 to jet 6 so as to control the rate of transfer of ion exchange material to column 2 as necessary in order to maintain a nearly constant level of the ion exchange material in column 2.

In an upper section thereof, column 2 is provided with means for determining, or controlling, the position of the interface between the layers of two liquids in the column. The drawing shows, as such means, several pairs of electrodes, 16 and 17, which project from a conduit 18 in the column at several elevations near the top of the column. The conduit, 18, contains insulated wires leading to the respective electrodes. Each pair of electrodes is used to determine the electric conductivity of the liquid therebetween. By employing two liquids having different electric conductivities in the column and making such conductivity measurements at several levels in the column, the position of the interface between the layers of liquids can be determined. The changes in amperage of the electric current flowing through such pairs of electrodes, which result from changes in the position of the interface between the liquid layers, can be used in known ways to automatically control the rate of flow of liquids to, or from, the column so as to maintain the position of said interface nearly constant. In place of a plurality of such pairs of electrodes, other usual devices such as a solid float which sinks in the less dense liquid, but floats on the more dense liquid; or a series of refractometers arranged to determine the index of refraction of the liquids at several levels in an upper section of column 1; can be used for determining and/or controlling the level of the interface between the layers of liquids in the column.

Column 2 is also shown as containing a series of horizontal perforated plates, 19, each provided with one or more downcomers, i. e. downward projecting spouts, 20, which plates are arranged at different levels in column 2 and divide the latter into interconnected chambers. The plates 19 retard the rate of descention of granules of ion exchange material in the column and prevent channeling of the ion exchange material during flow through the column. If desired, the plates 19 can be omitted. They are advantageously used when a column of greater than about 4 inches diameter is employed, since the tendency toward channeling in the flow of ion exchange material becomes greater with increase in the diameter of the column.

In applying the invention for the concentration of the magnesium salts of sea water, using the arrangement of apparatus shown in the drawing, one or both of the columns 1 and 2 are charged with a cation exchange agent. As such agent, there is usually employed the granular sodium salt of a sulfonated copolymer of styrene, ethylvinylbenzene, and divinylbenzene, but any of the various other known cation exchange agents can be used instead. Examples of such cation exchange agents are natural zeolite, sulfonated coal, sulfonated phenol-formaldehyde resins, and resinous carboxylic acids which are insoluble in water and in aqueous alkali solutions.

After charging the apparatus with the ion exchange material, sea water is fed to column 1 through inlet 21, a fairly concentrated aqueous sodium chloride solution is fed to column 2 through inlet 11, the power-driven star valves 5 and 8 are rotated, and water is fed through lines 7 and 10 to the jets 6 and 9 for purpose of conveying ion exchange material from the bottom of each tower to the top of the other. It may be mentioned that the star valves 5 and 8 perform several useful functions, i. e. they deliver ion exchange material from the bottom of each column without permitting free downward flow of liquid from the column and thus prevent channeling of the flows of liquids and solids in the column; they can be arranged and operated to provide a moderate pumping action which supplements the lifting action of the jets 5 and 8; and they appear to add to the efficiency of the jets in causing transfer of ion exchange material from one column to the other. Accordingly, although the star valves 5 and 8 can be omitted, use of the same is highly advantageous. It may also be mentioned that the ion exchange material sometimes causes binding, or locking, of the rotor in a star valve or similar device, but that this can be prevented by feeding a second stream of water, or other liquid, into the valve in a direction approximately parallel to the rotor shaft. This precautionary feature is not always required and is not indicated in the drawing.

When the system has been placed in operation, as just described, the ion exchange material passes downward through column 1, counter to an up-flow of sea water through the column, and enters into an ion exchange reaction with the sea water to chemically absorb magnesium ions therefrom. The rate of descent of the granules of ion exchange material in column 1 varies inversely with the rate of up-flow of sea water through the column and can be controlled by control of the rate of feed of the sea water. The height of column 1 is preferably, but not necessarily, such that half or more of the magnesium ions initially present in the sea water are absorbed prior to over-flow of the liquor from the column.

The cation exchange agent, containing the absorbed magnesium ions, passes from the bottom of tower 1 into line 3 and is transferred, by means of the star valve 5 and jet 6 through said line into the upper section of tower 2. The carrying liquid which is used for such transfer must have a density lower than that of the regenerant liquid, e. g. a sodium chloride solution, that is fed to tower 2 through inlet 11. This is necessary in order that the carrying liquid may float as a separate layer on the regenerant liquor in column 2 without diffusing into and diluting the regenerant liquor to a considerable extent. The carrier liquid overflows from the column through outlet 13.

The ion exchange material descends through column 2 counter to an up-flow of the regenerating liquid, e. g. an aqueous sodium chloride solution. The rate of descent of the ion exchange material is limited by the rate of up-flow of the regenerating liquid and also by the perforated plates, 19, when employed, which plates cause temporary interruptions in the fall of the ion exchange material and serve to prevent channeling of the material during passage through the column. Upon being fed into the upper section of column 2, the granules of ion exchange material descend rapidly and in dispersed, or scattered, manner through the upper layer of carrier liquid in column 2, but descend more slowly and become packed more closely together in the lower and more dense layer of regenerant liquor. As a result, the ion exchange material forms what appears to be a loose bed, or body, of moving granules in column 2, which bed or body has a fairly sharp and distinct upper surface. It may be mentioned that air, if present on the granules of ion exchange material fed to column 1, may prevent free movement of the granules through the interface between the two layers of liquid in the column and thus interfere with smooth operation of the process. To avoid possibility of this occurring, a vacuum is sometimes applied in a space above the liquids in column 2. This step, which is merely precautionary, is not indicated in the drawing.

During descent of the cation exchange agent through the regenerating liquid in column 2, an ion exchange reaction occurs with a result that magnesium ions are displaced, e. g. by sodium ions, from the ion exchange material with formation of a magnesium salt solution. This solution overflows, through header 23 and outlet 12, from the column and is collected as the product. Since one purpose of the process is to obtain an increase in the concentration of magnesium ions, the value of the product liquor is dependent, at least in part, on the concentration of magnesium ions therein. However, the concentration of magnesium ions in the product liquor is dependent on each of a number of factors, e. g. the concentration of the aqueous sodium chloride solution which is fed to column 2, the extent of the ion exchange reaction which occurs in the column, and the extent, if any, to which the magnesium salt solution resulting from the ion exchange reaction becomes diluted by the carrier liquid used for transfer of the ion exchange material from column 1 to column 2.

In order to produce a magnesium salt solution which is considerably richer than sea water in magnesium ions, the sodium chloride solution which is used to regenerate the ion exchange material should be fairly concentrated. In practice, the sodium chloride solution which is fed through inlet 11 to column 2 is of at least 10 weight per cent concentration and usually is of 15 per cent concentration or higher. A saturated sodium chloride solution, e. g. of about 26 per cent concentration, is preferably employed. The rate and extent of the ion exchange reaction are dependent upon several factors such as the temperature of the liquid undergoing treatment, the relative rates of feed of ion exchange material and the sodium chloride solution to column 2, the time of contact between these materials in the column, and the extent to which channeling occurs in the flow of either such material through the column. As hereinbefore mentioned, the perforated plates 19 serve to limit the extent to which channeling occurs in the flow of the ion exchange material through column 2 and assure good mixing of the ion exchange material with the sodium chloride solution. The ion exchange reactions in columns 1 and 2 are usually carried out at room temperature or thereabout, but the solution undergoing treatment in either column may be at any temperature between its freezing point and its boiling temperature. The relative rates of feed of the ion exchange material and the sodium chloride solution to column 2 are such as to form a product liquor which is richer in magnesium ions than is sea water. Column 2 is preferably of a height such that the ion exchange material is nearly depleted of magnesium ions during descent through the column. A column 12 feet in height has been used for the purpose and a shorter or taller column can be employed.

In order to avoid excessive dilution of the magnesium salt solution, which is formed in column 2, by the upper layer of liquid used for transfer of the ion exchange material to the column, it is important that the interface between these liquid layers be maintained above the outlet 12 for the magnesium salt solution. It is also important that the upper surface of the aforementioned loose bed, or body, of ion exchange material in column 1 be at or above the interface between the layers of liquid so as to avoid, as nearly as possible, repeated downward and upward movements of individual ion exchange granules through said interface such as may result from swirling of the liquids. The photoelectric cell, 15, responds, by a change in the current or voltage delivered therefrom, to a rise in the level of the loose body of ion exchange material in column 1, since a rise in said level screens light from the photoelectric cell. The current or voltage from the photoelectric cell can be, and is, applied in known manner to control the rate of flow of a carrying liquid through line 7 to jet 6 so as to regulate the rate of transfer of ion exchange resin to column 2 and maintain a nearly constant level of the loose bed of resin in column 2.

The series of electric conductivity measuring electrodes 16 and 17 serve to indicate the difference in conductivity of the liquid at different elevations in the upper section of column 2 and, since the two liquid layers in the column have different electric conductivities, they serve to indicate the approximate location of the interface between the liquid layers. This interface may be raised by increasing the rate of feed of the sodium chloride solution to the column or it may be lowered by reducing said rate of feed.

The rates of flow of the several materials to column 2 are preferably controlled so as to maintain the interface between the liquid layers well above, e. g. a foot or more above, the outlet 12 for the magnesium salt solution and so as to maintain the level of the loose bed or body of ion exchange material above the interface. Outlet 12 is provided with a screen which retains the ion exchange material in column 2.

The ion exchange material flows from the bottom of column 2 into line 4 and is transferred through said line by the action of valve 8 and jet 9 to the upper section of column 1.

The method just described can be applied in producing continuously, from sea water, a solution which contains from 5 to 10 per cent by weight or more of magnesium chloride and which contains a higher proportion of magnesium ions relative to the total weight of other metal ions present than is contained in sea water. The solution thus produced is sufficiently rich in magnesium chloride to warrant further steps, e. g. concentration and crystallization steps, to separate the magnesium chloride in solid form.

The method of the invention can also be applied in ways and for purpose other than the foregoing. For instance, instead of feeding a sodium chloride solution to tower 2 as the regenerating liquid, fairly concentrated e. g. 5 per cent by weight or more, aqueous solutions of other ionizable salts such as potassium chloride, sodium nitrate, or sodium sulphate, etc., can be used. Employment of a solution of sodium nitrate or sodium sulphate as the regenerating liquid results in formation of a solution containing magnesium nitrate or magnesium sulphate, respectively. Also, by use of an ion exchange material having a preferential absorptive action for only certain of several kinds of ions, e. g. cations, in a starting liquor, the process can be applied to separate the different kinds of ions from one another. The method can, of course, be applied in concentrating any of a wide variety of cations, e. g. sodium, potassium, lithium, calcium, or strontium ions, etc., which are initially present in dilute aqueous solutions thereof. Such starting solutions usually contain 5 per cent by weight or less of a compound of the ion to be concentrated. They may be extremely dilute.

By employing an anion exchange agent, particularly a strongly basic anion exchange agent, or a salt thereof, in place of a cation exchange agent, and operating otherwise as hereinbefore described, the process may be applied to concentrate anions, e. g. chloride, sulphate, or nitrate ions, etc., initially present in dilute aqueous solutions thereof and/or to separate certain anions from solutions containing the same together with other anions. A variety of anion exchange materials suitable for such purposes are known. Among the anion exchange agents that can be used are the resinous condensation products of phenol, formaldehyde and polyethylene polyamines such as diethylene triamine or triethylene tetraamine; and aminated resins formed by reaction of amines such as trimethylamine, dimethylethanolamine, or ethylenediamine with a solid chloromethylated copolymer of styrene, ethylvinylbenzene, and divinylbenzene; etc. For example, by using a nitrate of such anion exchange agent for the treatment of sea water in column 1 of the drawing, feeding a concentrated sodium nitrate solution into tower 2 as the regenerating liquid and operating otherwise as hereinbefore described, there is produced, as the liquor flowing through outlet 12 from column 2, an aqueous solution containing a higher concentration of chloride ions than that of sea water.

Two or more of the ion exchange systems illustrated in the drawing can be used in series to demineralize a dilute salt solution, such as sea water, with simultaneous formation of a product solution richer than the starting solution in cations recovered from the latter and another product solution richer than the starting solution in anions recovered from the starting solution. For such purpose, one of the ion exchange systems is advantageously charged with the basic form of a strongly basic anion exchange agent, such as one of the aforementioned aminated resins formed by reaction of a tertiary amine with a chloromethylated copolymer of styrene, ar-ethylvinylbenzene, and divinylbenzene, and the other ion exchange system is charged with the acidic form of a cation exchange agent, preferably a resin sulphonic acid which is insoluble in water and in aqueous alkali solutions. A fairly concentrated aqueous alkali solution, e. g. a sodium hydroxide solution of 10 per cent concentration or higher, is used for regeneration of the anion exchange agent and an aqueous solution containing 10 weight per cent or more of an acid, such as hydrochloric acid or nitric acid, etc., is used for regeneration of the cation exchange agent. The starting solution may be passed through a tower of either of the two ion exchange systems before being fed to the other, the preferred order of passage through the columns being dependent in part on the kind of starting solution employed. When the starting solution is sea water, it is preferably first passed through tower 1 of the system containing the acidic cation exchange agent and then through the corresponding column of the system containing the strongly basic anion exchange agent. Otherwise, operation of each of the two ion exchange systems is as hereinbefore described.

For example, an aqueous sodium chloride solution of 1 weight per cent concentration is fed through inlet 21 into column 1 of an ion exchange system similar to that illustrated in the drawing, which system contains a granular resinous quaternary ammonium base as an ion exchange agent. The system is operated as hereinbefore described, except that the regenerating liquid which is fed through inlet 11 to column 2 is an aqueous sodium hydroxide solution of about 10 weight per cent concentration. The product liquor flowing from column 2 through outlet 12 is a sodium chloride solution of from 3 to 6 weight per cent concentration or thereabout, i. e. it is richer in chloride ions than is the sodium chloride solution which is fed to column 1. The liquor overflowing from column 1 through outlet 22 is strongly alkaline. It is fed to a lower section of the corresponding column, i. e. column 1, of the ion exchange system containing the acidic cation exchange agent. The liquid flowing through outlet 22 from this column is demineralized water which is nearly free of ionized solutes. The regenerating liquid which is fed to column 2 of the last-mentioned ion exchange system is an aqueous hydrochloric acid solution of about 15 weight per cent concentration. The product flowing through outlet 12 of the column is a sodium chloride solution of from 5 to 10 per cent concentration or thereabout, i. e. it is more concentrated than the sodium chloride solution used as a starting material. The mode of operation just described has the advantages of demineralizing, or reducing the sodium chloride content of, the dilute aqueous sodium chloride solution which is used as a starting material and at the same time concentrating the sodium chloride content thereof without resorting to exaporation.

It will be evident from the foregoing that the continuous ion exchange method of the invention can be applied not only for purpose of concentrating, or segregating, desired ions which are contained in an aqueous starting solution, but also in demineralizing dilute aqueous salt solutions to recover the salt content thereof in more concentrated form and, further, as steps in the manufacture of compounds containing the recovered ions, e. g. in the manufacture of magnesium nitrate from a dilute aqueous magnesium chloride solution.

The following examples describe ways in which the invention has been practiced and illustrate certain of its advantages, but are not to be construed as limiting its scope.

Example 1

An arrangement of apparatus similar to that illustrated in the drawing was employed for the recovery from sea water of magnesium chloride as a more concentrated solution thereof. The apparatus was charged with a granular cation exchange agent consisting of the sodium salt of a sulfonated copolymer of styrene and minor amounts of ar-ethylvinylbenzene and divinylbenzene. Sea water, which analyzed as containing 0.43 per cent by weight of sodium ions, 0.0635 per cent of magnesium ions and 0.99 per cent of chloride ions and which had a specific gravity of 1.012 at room temperature, was fed in steady flow through inlet 21 to column 1. An aqueous sodium chloride solution which analyzed as containing 10.18 per cent by weight of sodium ions, 0.007 per cent of magnesium ions and 14.58 per cent of chloride ions and which had a specific gravity of 1.192 at room temperature was fed to column 2 through inlet 11. The star valves 5 and 8 were operated and fresh water was fed through lines 7 and 10 to the jets 6 and 9 so as to cause continual transfer of ion exchange material from the bottom of each column to the top of the other. The lamp 14 and photoelectric cell 15 were used to determine the level of the upper surface of the loose bed of ion exchange material in column 2 and the several pairs of electrodes 16 and 17 were used to determine the position of the interface between the two layers of liquid in column 2. The measured values for the electric resistivities of the two layers drifted somewhat, due apparently to partial polarization of the electrodes, but the upper layer always had the greater resistivity. Typical resistance readings were 40 ohms for the lower liquid layer and 280 ohms for the upper layer. The photoelectric cell 15 was electrically connected, in a conventional manner, so as automatically to operate a valve controlling rate of flow of water through line 7 to jet 6 and thereby regulate the rate of feed of ion exchange material into the upper section of column 2. Sea water which had been depleted of magnesium ions flowed from column 1 through outlet 22, and the lower and upper layers of liquid in column 2 overflowed from the column through the respective outlets 12 and 13. The rates of feed, of withdrawal, and of circulation of the several materials were balanced with one another so as to maintain the interface between the liquid layers in column 2 at a level between the outlets 12 and 13 and so as to maintain the upper surface of the loose bed of ion exchange material not lower than said interface, but below the outlet 13. The liquids employed in the process were at room temperature. The solution flowing from column 2 through outlet 12 was collected as the product from the process. It contained approximately 10.53 per cent by weight of magnesium chloride and 8.51 per cent of sodium chloride. The concentration of magnesium chloride in the product solution was more than 40 times as great as in the sea water used as a starting material.

Example 2

The apparatus and procedure employed in this experiment were similar to those of Example 1, except that the liquids flowing in and through the system were heated and maintained at temperatures of from 60° to 80° C. The concentration of magnesium chloride in the product liquor flowing through outlet 12 from column 2 varied, due apparently to variations in the extent of diffusion between the two liquid layers in column 2, but was for the most part between 5.3 and 9.3 per cent by weight. Except for an increased tendency toward diffusion between, or mixing of, the liquid layers in column 2, the process was as satisfactory at the elevated temperature as when carried out at room temperature.

We claim:

1. A method for concentrating ions of ionizable solutes in a continuous manner, which method comprises feeding a dilute aqueous solution of an ionizable compound, containing ions of the kind to be concentrated, into a lower section of a column which is filled to overflowing with a liquid, feeding into an upper section of the column a granular ion exchange material which is chemically reactive to absorb said ions, the relative rates of feed of these materials being such that the ion exchange material descends in the column counter to an up-flow of liquid, withdrawing ion exchange material from a lower section of the column and passing it together with a stream of a carrier liquid into an upper section of a second column which is partially filled with an upflowing stream of an aqueous liquid that is more dense than said carrier liquid and less dense than the granules of ion exchange material so that the two streams meet at an interfacial zone between an outlet for the carrier liquid and an outlet therebelow for the more dense liquid, both of which outlets are from an upper section of the column, so that the carrier liquid flows from the column and the ion exchange material descends in the second column through the two layers of liquids, feeding into a lower section of the second column an aqueous regenerating solution that comprises a sufficient concentration of an ionizable solute, which is reactive with the ion exchange material to displace from the latter the ions of the kind which are to be concentrated and replace them with ions of a different kind which have a similar kind of electric charge, so that there is formed in contact with the ion exchange material an aqueous solution containing said displaced ions in a concentration greater than the concentration of said ions in the starting solution which is fed to the first column, withdrawing the solution of the displaced ions from an upper section of the second column at a point below the interface between the two streams of liquid in the column, withdrawing ion exchange material from a lower section of the column and returning it as a slurry in an aqueous carrier liquid into an upper section of the first column and, while continuing said operation, maintaining the interface between the two liquid layers in said second column above the point at which the more dense of the liquids is withdrawn from the column and maintaining the upper surface of a loose body of ion exchange material which is present in the second column at a level at least as high as the interface between the two liquid layers by controlling the relative rates of feed to and withdrawal of materials from, said second column.

2. A method, as claimed in claim 1, wherein the ion exchange material is a cation exchange agent, the ionizable compound in the dilute aqueous starting solution is a salt, and the regenerating solution is a salt which contains a cation different from that of the ionizable compound in the starting solution.

3. A method, as claimed in claim 1, wherein the ion exchange material is a resin sulfonate, the starting solution is a natural brine having a small proportion of a magnesium salt dissolved therein, the regenerating solution is an aqueous sodium chloride solution of at least 10 weight per cent concentration and the aqueous solution which is formed as a product by treatment of the ion exchange material with the regenerating solution contains magnesium ions in a concentration higher than the concentration of magnesium ions in the starting solution.

4. A method, as claimed in claim 3, wherein the starting solution is sea water and the product solution contains at least 5 weight per cent of magnesium chloride.

5. A method, as claimed in claim 1, wherein the granular ion exchange material is withdrawn from a lower section of each tower, while preventing free flow of liquid through the granular ion exchange material that is being withdrawn, and the withdrawn ion exchange material is fed into admixture with a stream of an aqueous liquid and is conveyed by the liquid stream into an upper section of the other column.

6. A method, as claimed in claim 5, wherein the ion exchange material is a resin sulfonate, the starting solution is a natural brine having a small proportion of a magnesium salt dissolved therein, the regenerating solution is an aqueous sodium chloride solution of at least 10 weight per cent concentration and the aqueous solution which is formed as a product by treatment of the ion exchange material with the regenerating solution contains magnesium ions in a concentration higher than the concentration of magnesium ions in the starting solution.

7. A method, as claimed in claim 5, wherein the starting solution is sea water and the product solution contains at least 5 weight per cent of magnesium chloride.

8. A method, as claimed in claim 1, wherein the ion exchange material is an anion exchange agent, the dilute aqueous starting solution contains an anion which is to be concentrated, and the regenerating solution contains a dissolved ionizable solute having an anion of a kind other than that which is to be concentrated.

WILLIAM F. McILHENNY.
VERNON O. McCONNELL.

References Cited in the file of this patent

UNITED STATES PATENTS

| Number | Name | Date |
|---|---|---|
| 2,387,898 | Grebe et al. | Oct. 30, 1945 |
| 2,409,861 | Hunter et al. | Oct. 22, 1946 |